Patented Nov. 21, 1944

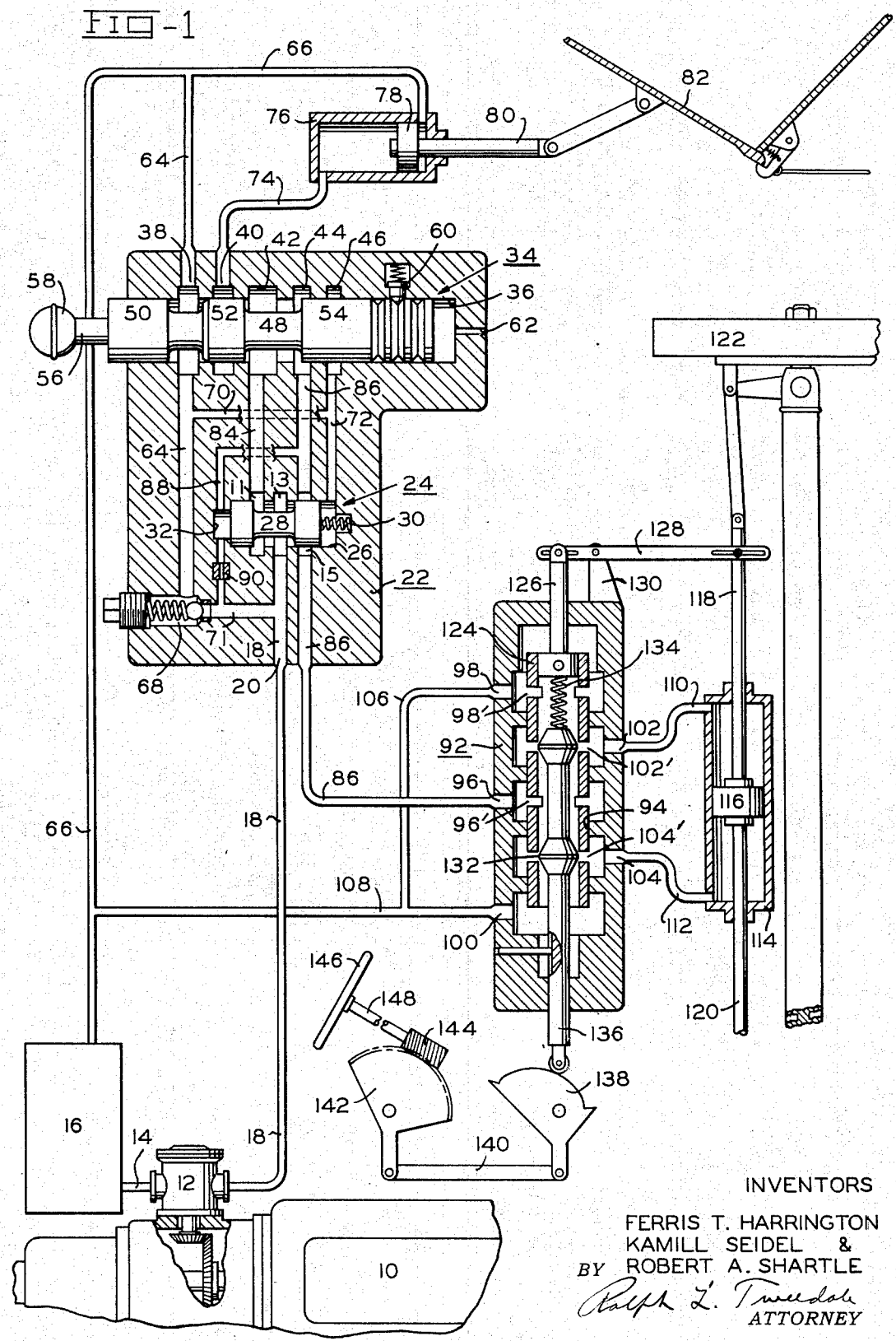

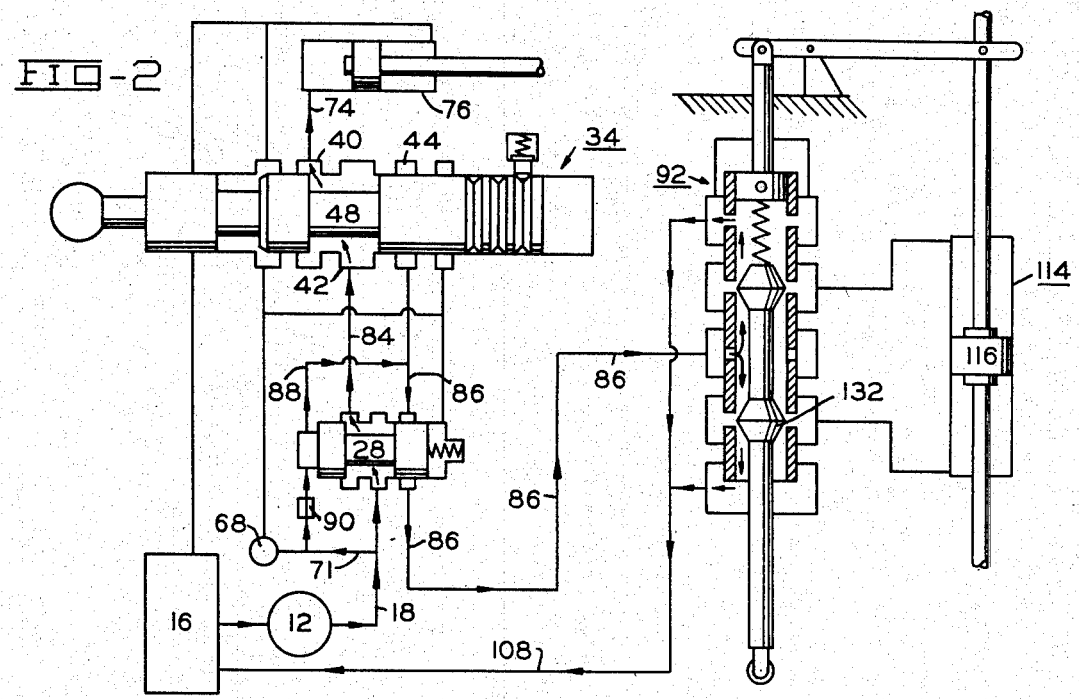
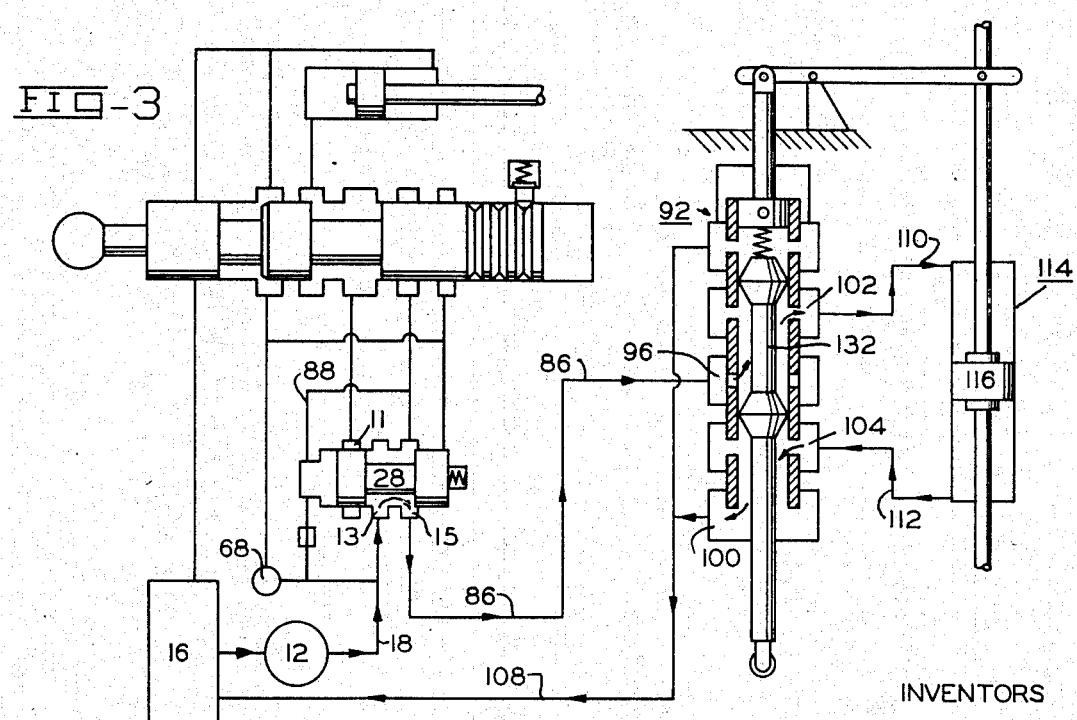

2,363,179

UNITED STATES PATENT OFFICE 2,363,179

POWER TRANSMISSION

Ferris T. Harrington, Detroit, and Kamill Seidel, Grosse Pointe Farms, Mich., and Robert A. Shartle, Rockford, Ill., assignors to Vickers Incorporated, Detroit, Mich., a corporation of Michigan Application February 21, 1942, Serial No. 431,830

6 Claims. (Cl. 60—97)

This invention relates to power transmissions, particularly to those of the type comprising two or more fluid pressure energy translating devices, one of which may function as a pump and another as a fluid motor.

The invention is particularly concerned with a system wherein a plurality of motors must be operated from a single pump, and particularly to systems where one of the motors should have precedence over another in receiving operating fluid from the source.

As an example of situations where the present invention is particularly useful, the case of a power-operated dump truck may be considered. The larger sizes of such trucks require some form of steering booster to amplify the manual effort of the operator in turning the huge wheels and controlling them over the rough terrain encountered on excavating projects. Hydraulic steering boosters for this purpose have been a standard commodity on the market for several years and are admirably suited for this purpose. An inherent characteristic of such boosters, however, is that, when they are not actually operating to steer the vehicle, they bypass or unload the pump, or, as is termed in the art, they operate on an open-center condition. This means that the pump which supplies the steering booster cannot be made available for operating other hydraulic motors such as the body-dumping cylinder. When the steering booster is actually operating, it requires the full delivery and pressure capacity of the pump. On the other hand, when it is not operating, it bypasses the pump and accordingly disables it for any other use.

It is an object of the present invention to provide an improved power transmission system which will overcome the above difficulties and permit an open-center steering booster to be utilized with a single pump pressure source and, at the same time, to make the pump delivery available to an auxiliary motor at such times that the steering booster is not utilizing such delivery. At the same time, the present invention seeks to provide such a system wherein the benefits of open-center unloading are obtained during such times as neither the steering booster nor the auxiliary motor are being operated.

Further objects and advantages of the present invention will be apparent from the following description, reference being had to the accompanying drawings wherein a preferred form of the present invention is clearly shown.

In the drawings:

Figure 1 is a diagrammatic view of a hydraulic power transmission system embodying a preferred form of the present invention.

Figures 2 and 3 are diagrammatic views of the hydraulic power transmission system of Figure 1 showing the controls in different operating positions.

Referring now to Figures 1, 10 represents a suitable prime mover, such as an internal combustion engine, adapted to drive a pump 12 which may be a rotary feed pump of any suitable construction. The pump 12 has a suction conduit 14 for withdrawing fluid from a tank 16 and a delivery conduit 18 for directing the delivery therefrom to one port 20 of a combination control valve generally designated 22. The latter comprises a unitary block including a pressure responsive sequence valve 24 having annular ports 11, 13 and 15 formed at spaced positions along bore 26. Valve spool 28 is slidable across the ports to selectively connect port 13 either with port 11, as illustrated, when in its lefthand position, or with port 15 when in its righthand position. A spring 30 normally biases the valve spool 28 to the left. The left end of the bore 26 is in direct communication with a bore 32 of reduced diameter which is connected to a source of pressure supply for shifting the valve spool 28 to the right.

Combination control valve 22 also includes a three-way, directional valve 34 which comprises a bore 36 having a plurality of annular ports arranged along its length, of which 38 and 46 are tank ports, 42 and 44 are pressure ports, and 40 is a cylinder port. Communication between the various ports is controlled by a valve spool 48 slidably mounted in bore 36. Spool 48 contains three solid lands 50, 52 and 54 which, when in neutral position, illustrated, connect ports 42 and 44 and block cylinder port 40. Spool 48 is also provided with a stem 56 whereby the spool 48 may be shifted to any one of three effective operating positions by means of a suitable operator, such as designated at 58. A spring-pressed detent 60 is provided for retaining the valve frictionally in either one of its three effective positions. The extreme right end of bore 36 is provided with an air vent passage 62.

Tank port 38 communicates with tank 16 through conduits 64 and 66. A relief valve 68 connects with a pressure branch conduit 71 for limiting the pressure therein to a predetermined maximum by exhausting into the conduit 64. Tank conduit 64 has an auxiliary conduit 70 which extends to a conduit 72. The latter connects port 46 of valve 34 with the right end of bore 26 of valve 24, serving to drain any leakage that may occur past the spools 48 and 28.

Cylinder port 40 of valve 34 is connected by a conduit 74 which leads to the head end of a cylinder 76. The latter has slidably mounted therein a piston 78 which has a rod 80 attached to a dumper 82 for communicating its motion thereto. The rod end of the cylinder 76 is connected by the conduit 66 to drain any leakage that may occur past the piston 78.

Ports 42 and 44 of bore 36 communicate with ports 11 and 15 of bore 26 through conduits 84 and 86, respectively. Conduit 86 has a branch conduit 88 which extends to the bore 32, and therefrom to the pressure branch conduit 71, passing through a restriction 90. Conduit 86 extends beyond port 15 of bore 26 to a follow-up valve 92.

Valve 92 comprises a main body having a longitudinal bore 94 provided with a plurality of annular ports arranged along its length, of which 96 is a pressure port, 98 and 100 are tank ports, and 102 and 104 are cylinder ports. Pressure port 96 is connected by the conduit 86, while tank ports 98 and 100 are connected by conduits 106 and 108, the latter communicating with conduits 106 and 66. Cylinder ports 102 and 104 are connected by conduits 110 and 112, respectively, which extend to the opposite ends of a non-differential cylinder 114. The latter contains a piston 116 having rods 118 and 120 extending therefrom and adapted to guide the wheels of a vehicle, of which one, 122, is shown.

Within bore 94 of valve 92 there is slidably mounted a sleeve member 124 which contains ports 96', 98', 102' and 104', corresponding to those of bore 94. The upper end of the sleeve 124 has secured thereto a shaft 126 which is attached to a lever arm 128. The latter is attached to the rod 118 pivoting about a fulcrum 130.

Valve spool 132 is slidable across the sleeve ports to selectively connect pressure port 96 of bore 94, through corresponding sleeve ports, with either cylinder port 102 when in its upper position or with cylinder port 104 when in its lower position, simultaneously providing for the discharging liquid to pass therethrough to the tank 16. A spring 134 normally biases the valve spool 132 downwardly. Attached to the bottom of spool 132 is an operating stem 136 which extends downward to a cam 138 for the operation thereof. Cam 138 is connected by a rod 140 to a gear rack 142 which is operated by a worm gear 144. The latter is attached to a steering wheel 146 by a rod 148.

The operation of the valve 92 is such that, whatever distance the operating plunger 136 is moved by the cam 138 in either direction from the neutral position, liquid flowing therethrough will cause the cylinder 114 to proportionally duplicate the shaft movement, as is well known in the art. When no movement is required, the liquid at the pressure port 96 is discharged to the tank at no appreciable pressure. The shutting off of the valve 92 is controlled by the valve linkage 128 connected to the rod 118. Whatever distance the plunger 136 is moved, the piston 116 in cylinder 114 will move a similar or proportional distance, depending on the amplification of the lever 128, and shut off the valve 92 by pulling the sleeve 124 until ports 102' and 104' become centered with the spool 132, thus allowing the fluid to discharge to the tank.

In operation, while pump 12 is being driven by the motor 10, as shown in Figure 1, oil is withdrawn from the tank 16 through the suction conduit 14 and delivered to the delivery conduit 18. The latter directs the fluid to the control valve 22 where it enters port 13 of sequence valve 24. Spool 28, being in the position shown, directs the liquid through port 11 into conduit 84 which directs it to valve 34 entering port 42. The latter being connected with port 44 causes it to flow into conduit 86 which directs the fluid around valve spool 28 through port 15 of valve 24 to the follow valve 92, entering the latter at pressure port 96. Valve 92, being an open-center valve, allows the liquid to escape to the tank through both tank ports 98 and 100.

To operate the dumping cylinder 76, valve spool 48 of valve 34 is pulled outward, connecting port 42 with port 40 and blocking port 44, as shown diagrammatically in Figure 2. This directs the liquid entering port 42 to pass through port 40 into the conduit 74 which delivers it to the dumping cylinder 76. As the liquid is now under pressure, it is caused to flow from pressure branch conduit 71 into branch conduit 88, through restriction 90, and to conduit 86. The latter directs the fluid to the follow-up valve 92 which, being in neutral position, as shown, directs the liquid to the tank 16 without imposing any resistance. Consequently, the liquid in conduits 86 and 88 is maintained under no appreciable pressure, and the shifting of the sequence valve spool 28 is prevented.

If, however, while operating the dumper 82, the need arises to steer the vehicle, and steering wheel 146 is turned, valve spool 132 of follow-up valve 92 is shifted, as shown in Figure 3, connecting pressure port 96 with cylinder port 102, and cylinder port 104 with tank port 100, directing the liquid to the upper end of the cylinder 114. This causes pressure to build up in the conduit 86 which is transmitted through the branch conduit 88 to the left end of spool 28. Valve spool 28 is then shifted to the right, connecting port 13 with port 15 and blocking port 11, directing the full pump delivery directly to the steering booster 92 until the desired movement is completed, whereupon valve 92 again discharges to tank the pump delivery, reducing the pressure in conduit 86. This will cause sequence valve 24 to be moved to the left by the spring 30, connecting port 13 with port 11, resuming the operation of lifting the dumper 82, as shown in Figure 2.

To lower the dumper 82, valve spool 48 of valve 34 (Figure 1) is pushed inward, connecting port 40 with tank port 38, and port 42 with port 44. This provides for the liquid in cylinder 76 to discharge to the tank, being forced out of the cylinder 76 by the weight of the dumper 82, and also allows the pump delivery to flow to tank through follow valve 92, in the manner hereinbefore disclosed.

Thus, it will be seen that this invention provides a means of using the pressure source of a single pump for the operation of a dump truck lift and a steering booster control, giving precedence to the latter.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a single pressure source and a plurality of fluid motors operable thereby, individual control valves for each motor, one valve being of the open-center type and arranged to bypass fluid from its inlet to its outlet when in neutral position, means connecting another valve to said source and arranged to normally cut off at least a major portion of the fluid bypassed through the first valve when the second valve is moved to operating position, and means including a pressure responsive valve for cutting off the supply to the second valve and diverting that supply to the first valve and motor whenever the first valve is operated while the second valve is in operating position.

2. In a hydraulic power transmission system the combination of a single pressure source and a plurality of fluid motors operable thereby, and means for selectively delivering fluid from the source to either motor with precedence given to one or to freely bypass the source when neither motor requires fluid, said means comprising individual selector valves for each motor, one of which unloads the source when in neutral position, means in the other valve for substantially blocking the supply of fluid to said one valve when the other valve is operated, and a pressure responsive valve for diverting the supply from said other valve to the one valve whenever the one valve is operated.

3. In a hydraulic power transmission system the combination of a single pressure source and a plurality of fluid motors operable thereby, individual control valves for each motor and providing when all valves are in neutral position a free bypass for the source through the valves in series, means in each valve for closing such bypass when the valve is shifted to operate its corresponding motor and directing the fluid delivery from the source to the motor and cutting delivery off from another valve, whereby the valve which is nearest the source would when operated normally take all the source delivery, and a pressure responsive valve for delivering fluid directly from the source to a valve remote from the source and arranged to be operated immediately whenever such remote valve is operated at the same time that said nearest valve is operated.

4. In a hydraulic power transmission system the combination of a single pressure source and a plurality of fluid motors operable thereby, individual control valves for each motor and providing when all valves are in neutral position a free bypass for the source through the valves in series, means in each valve for closing such bypass when the valve is shifted to operate its corresponding motor and directing the fluid delivery from the source to the motor and cutting delivery off from another valve, whereby the valve which is nearest the source would when operated normally take all the source delivery, and a pressure responsive valve for delivering fluid directly from the source to a valve remote from the source whenever such remote valve is operated at the same time that said nearest valve is operated, said pressure responsive valve including a restricted bypass for diverting a small portion of the source delivery to said remote valve while the nearest valve is operated.

5. In a hydraulic power transmission system for vehicle use the combination of a single pump for supplying fluid under pressure, a steering booster having a control valve of the open-center type effective to bypass the pump when not actually operating, an auxiliary motor to be operated selectively during intervals when the steering booster is not operating, and a combined manual and pressure-controlled selector valve assembly connected between the pump and the steering booster and containing means for directing the pump delivery to the auxiliary motor at only such times as the booster control valve is in pump bypassing position.

6. In a hydraulic power transmission system for vehicle use the combination of a single pump for supplying fluid under pressure, a steering booster having a control valve of the open-center type effective to bypass the pump when not actually operating, an auxiliary motor to be operated selectively during intervals when the steering booster is not operating, a combined manual and pressure-controlled selector valve assembly connected between the pump and the steering booster and containing means for directing the pump delivery to the auxiliary motor at only such times as the steering booster is in pump bypassing position, said means comprising a restricted diverter passage for delivering a limited flow from the pump through the booster control valve while the major flow takes place to the auxiliary motor, and a valve responsive to pressure conditions in said diverter passage for transferring the full pump delivery to the booster control valve whenever the latter is shifted to operating position.

FERRIS T. HARRINGTON.
KAMILL SEIDEL.
ROBERT A. SHARTLE.